United States Patent [19]

Scudder

[11] E Re. 28,621

[45] Reissued Nov. 25, 1975

[54] FLUID ANGULAR RATE SENSOR

[75] Inventor: Kenneth R. Scudder, Chevy Chase, Md.

[73] Assignee: The United States of America as represented by the Secretary of the Army, Washington, D.C.

[22] Filed: July 17, 1969

[21] Appl. No.: 852,265

Related U.S. Patent Documents

Reissue of:

[64] Patent No.: 3,365,955
Issued: Jan. 30, 1968
Appl. No.: 524,358
Filed: Feb. 1, 1966

[52] U.S. Cl. ..... 73/505
[51] Int. Cl. ..... G01p 3/26
[58] Field of Search ..... 73/194, 505, 515; 137/81.5

[56] References Cited

UNITED STATES PATENTS

| | | | |
|---|---|---|---|
| 3,272,213 | 9/1966 | Jones | 73/194 |
| 3,276,259 | 10/1966 | Bowles et al. | 73/194 |
| 3,319,471 | 5/1967 | Hermann | 73/505;194 X |
| 3,320,815 | 5/1967 | Bowles | 73/194 |
| 3,386,291 | 6/1968 | Evans et al. | 73/505 |

*Primary Examiner*—Herbert Goldstein
*Attorney, Agent, or Firm*—Nathan Edelberg; Robert P. Gibson; Saul Elbaum

[57] ABSTRACT

An improved fluid readout means for devices that measure the angular rate of rotation of a body about an axis. A slotted cylinder is positioned in the drain of a vortex rate sensor, with its axis transverse to the drain axis. The slots are located in the upstream portion of the cylinder and are at a very small radius from the drain axis. As the helical angle of the flow through the drain changes due to changes in rotation of the rate sensor the static pressure at the slots changes, and the pickoff produces a fluid output signal which is proportional to the angular rate of rotation of the sensor. Increased sensitivity may be achieved by introducing an airfoil section upstream of and in close proximity with the slotted cylinder. Alternatively, an airfoil section can be positioned to extend completely across the drain and serve to direct the helical flow to a splitter located downstream of the airfoil to produce a high flow output signal that is proportional to the angular rate of rotation of the sensor.

7 Claims, 11 Drawing Figures

INVENTOR
KENNETH R. SCUDDER

BY Harry M. Saragovitz, Edward J. Kelly, Herbert Berl & J. D. Edgerton Jr.

ATTORNEYS

INVENTOR
KENNETH R. SCUDDER

BY Harry M. Saragovitz, Edward J. Kelly, Herbert Berl & J. D. Edgerton

FLUID ANGULAR RATE SENSOR

Matter enclosed in heavy brackets [ ] appears in the original patent but forms no part of this reissue specification; matter printed in italics indicates the additions made by reissue.

This invention relates to pure fluid devices for measuring the angular rate of rotation of a body about an axis and particularly to improved fluid readout means for such devices.

The state-of-the-art of pure fluid devices has been considerably advanced since the basic fluid amplifiers were built and tested at the Harry Diamond Laboratories in 1959. One example of the extent to which the state-of-the-art has advanced can be seen in the October 1964 issue of Control Engineering, wherein an all fluid no-moving parts attitude control system for a missile is described. This system is designed to take the error signals of an attitude sensing device and modulate and amplify these signals to ultimately control the attitude of the missile. Since the control system is designed to be all fluid-operated and without moving parts, the output from the attitude sensing device must be in the form of fluid signals in order for the sensor to be compatible with the rest of the system.

One type of pure fluid attitude sensor that has been used to supply the error signals for the missile control system is the fluid-operated rotation sensing device disclosed by Romald E. Bowles in his patent application Ser. No. 171,538, now U.S. Pat. No. 3,320,815, filed Feb. 6, 1962, and assigned to the assignee in the instant application. The Bowles rotation sensor is commonly referred to in the art as a vortex rate sensor because it operates on the principles of vortex mtion.

The operation of a vortex rate sensor can be easily understood by considering a relatively flat cylindrical chamber having a relatively small central drain or output passage therein to which fluid under pressure such as air is supplied at or near the circumference of the chamber. The chamber is provided normally with an annular ring or coupler made of a porous material such that fluid flowing through the coupler will have only a radial component of velocity. When the rate sensor is rotated in a plane perpendicular to its axis, a tangential component of velocity is imposed on the fluid as it leaves the coupler whereby vortex flow is produced in the chamber and helical flow is produced in the drain. Because of the conservation of angular momentum, the tangential velocity of the flow and consequently the velocity of the fluid in the vortex increases as the fluid reaches the drain, thereby providing an amplification factor for the sensor. By appropriately sensing the flow parameters in the drain, particularly the changes in the helical angle, the angular rate of the sensor can be determined.

H. D. Ogren in his recently issued U.S. Pat. No. 3,203,237 entitled "Vortex Rate Sensor," discloses a readout system for a vortex rate sensor comprising a movable airfoil member connected to a transducing means whereby movement of the airfoil member in response to changes in the helical flow in the drain will produce an electrical output signal indicative of the angular rate of rotation of the sensor. While Ogren's rate sensor has application to more conventional attitude control systems that utilize electrical error signals, his readout device would not be useful in an all fluid control system such as contemplated above.

The Bowles' rate sensor mentioned above provides the fluid readout required by an all fluid attitude control or guidance system, but considerable difficulty has been encountered with the Bowles' rate sensor in producing an output signal that has a high signal-to-noise ratio and a high sensitivity.

The instant invention is concerned with basically two types of fluid readout means or pickoffs for a vortex rate sensor. The first type of pickoff is employed when the device driven by the sensor has a high input impedance and requires relatively low flow, and the second is employed when the device driven by the sensor has a low input impedance and requires relatively large flow.

At this point it would be useful to consider briefly the properties of vortex sink flow, so that the invention can be more readily understood.

Vortex motion can be divided into two distinct types of motion, the forced vortex and the free vortex. The forced vortex occurs when all particles of the fluid have the same angular velocity and, therefore, the tangential velocity, $V_t$, is directly proportional to the radius. This is equivalent to solid body or wheel-like rotation and is sometimes referred to as rotational flow. As the radius increases, the tangential velocity increases linearly. In the free vortex where the flow is irrotational, the tangential velocity, $V_t$, varies inversely with the radius. Also, the centrifugal force decreases with increasing radius. Both of these vortex conditions occur naturally in real vortex motion with certain limitations.

In free inviscid vortex motion conservation of angular momentum is assumed. When the total pressure is considered in a vortex, it is seen that free vortex flow cannot occur in practice for very small radii. For example, in the incompressible case $$P_{total}=P_{static}+\tfrac{1}{2}\rho V_t^2$$

and for the free vortex $$V_t=k/r$$

where k is a constant.

Now $P_{total}$ is a constant and $P_{static}$ cannot in practice become negative; therefore, the tangential velocity, $V_t$, cannot exceed the maximum velocity given by $$V_{t\,max.}=\sqrt{2/\rho(P_{total}-P_{static})}$$

The real vortex motion then has both forced vortex motion near its axis and free vortex motion at some distance from its axis. Separating these two regions is a transition region where the tangential velocity reaches a maximum. This tangential velocity distribution is characteristic for all real vortex devices. The maximum tangential velocity, $V_t$, occurs at a small radius from the center which defines a circle called the "limit circle." For maximum sensitivity of the rate sensor; therefore, it is desirable to position a pick-off in the vicinity of the limit circle so that the maximum tangential velocity and consequently the maximum pressure change can be sensed.

It is, therefore, an object of the present invention to provide a vortex rate sensor having improved fluid readout means.

Another object of the instant invention is to provide a vortex rate sensor that produces fluid output signals having a high signal-to-noise ratio.

A further object of the instant invention, is to provide a vortex rate sensor that is sensitive throughout a wide range of changes in the flow direction.

Still another object of the present invention is to provide a vortex rate sensor that produces fluid output signals for fluid devices which have high input impedances.

Yet another object of this invention is to provide a vortex rate sensor that produces fluid output signals for fluid devices which have low input impedances.

In accordance with one aspect of the present invention, the foregoing and other objects are attained by providing pickoff means in the drain of a vortex rate sensor that comprises a slotted cylinder positioned with its axis transverse to the drain axis wherein the slots are located in the upstream portion of the cylinder and are at a very small radius from the drain axis. The slotted cylinder acts like a direction-finding pitot tube to measure the changes in the angle of the helical flow through the drain produced when the rate sensor is rotated in a plane perpendicular to its axis. As the helical angle changes, the static pressure at the slots changes, and the pickoff produces a fluid output signal that is proportional to the angular rate of rotation of the sensor.

In accordance with another aspect of the invention, an airfoil section is positioned upstream of and in close proximity with a similarly positioned slotted cylinder to amplify the change in helical angle of the flow through the drain as seen by the slotted cylinder.

In accordance with still another aspect of the instant invention an airfoil section is positioned to extend completely across the drain and serves to direct the helical flow to a splitter located downstream of the airfoil to produce a high flow output signal that is proportional to the angular rate of rotation of the sensor.

The specific nature of the invention, as well as other objects, aspects, uses, and advantages thereof, will clearly appear from the following description and from the accompanying drawings, in which.

Figure 1:
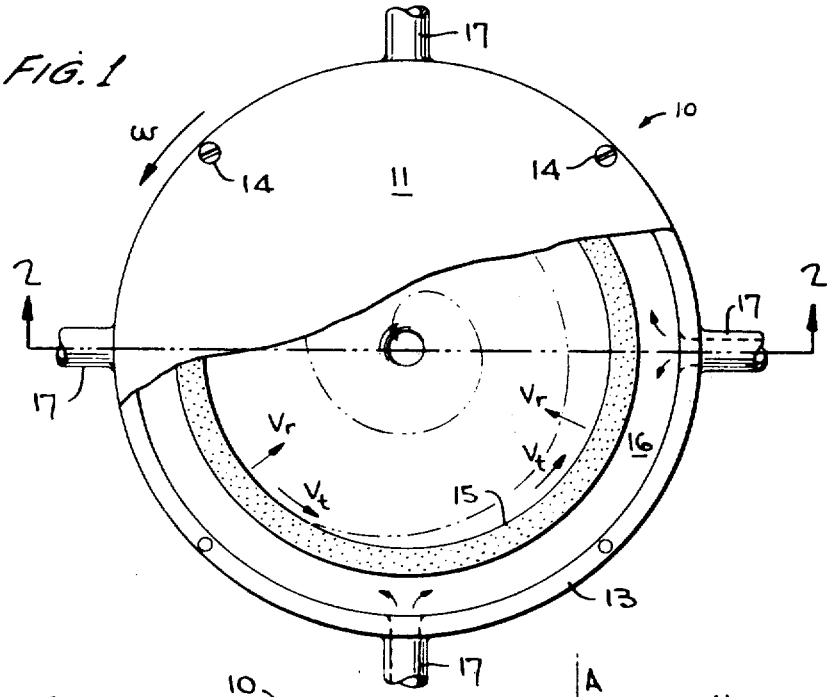
FIG. 1 is a plan view, partly in section, of a vortex rate sensor.
Figure 2:
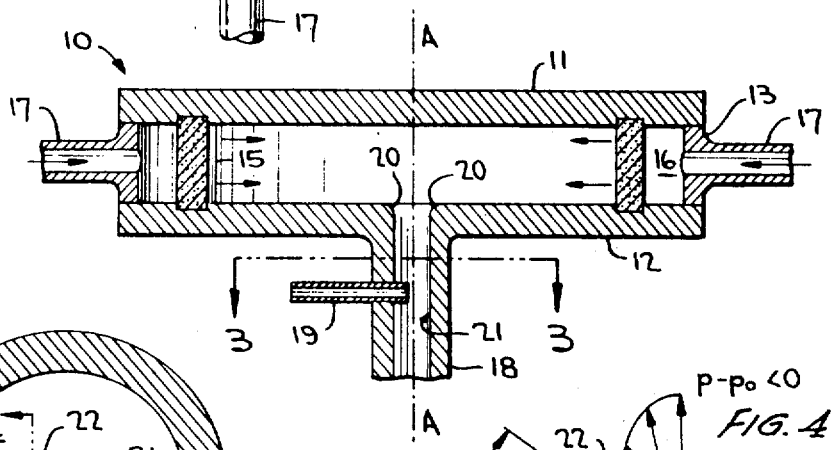
FIG. 2 is a cross-sectional view taken along lines 2—2 of FIG. 1.

Referring now to the drawing wherein like numerals designate identical or corresponding parts throughout the several views, and more particularly to FIGS. 1 and 2 where there is shown a vortex rate sensor generally indicated by the reference numeral 10. Rate sensor 10 is essentially a relatively flat, hollow, cylindrical chamber that includes a circular top wall 11, a circular bottom wall 12 in spaced parallel relation thereto, and an annular side wall 13 secured in a fluid tight relation to the top and bottom walls by any suitable means such as the screws 14. An annular porous ring or coupler 15 is positioned within the chamber of the rate sensor at a smaller radius than annular wall 13 and provides a manifold 16 between coupler 15 and annular wall 13. Top and bottom walls 11 and 12, respectively, and annular wall 13 may be constructed of any rigid material such as metal, glass, plastic or the like that is compatible with and impervious to the working fluid. Coupler 15 is preferably made of a sintered metal but may be made of any suitable porous material that allows fluid to pass through it with a minimum of restriction.

Fluid under pressure from a source (not shown) enters rate sensor 10 by means of one or more input nozzles 17 formed in the annular wall 13, and leaves the rate sensor by means of a centrally located drain tube 18 provided in the bottom plate 12 to be discharged to the ambient condition or to a sump (not shown). While only one drain is shown, it will be obvious that a second drain may be provided in the top plate 11 if desired.

Positioned within drain tube 18 is a fluid readout means 19 which consists essentially of a thin-walled cylindrical tube that extends through the wall of the drain tube 18 and into the drain passage 21 formed thereby to the central axis A—A. Readout means 19, referred to also as a pickoff, senses changes in the fluid flow leaving the rate sensor 10 and transmits these changes as fluid output signals to suitable fluid elements (not shown) in the rest of the control system of which the rate sensor forms a part. In the missile guidance system mentioned above, the fluid output signals from rate sensor 10 are transmitted to the inputs of a fluid pulse width modulator such as disclosed by Warren et al. in their application Serial No. 312,808, now U.S. Pat. No. 3,228,410, filed Sept. 30, 1963, for "Fluid Pulse Width Modulation." In another application, the fluid output signals produced by pickoff 19 might be amplified by means of a proportional fluid amplifier.

Figure 3:
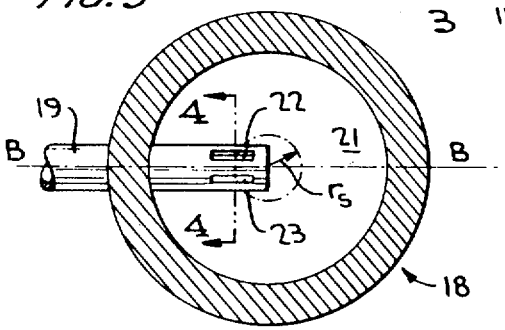
FIG. 3 is an enlarged cross-sectional view taken along lines 3—3 of FIG. 2 and shows the positioning of a slotted cylinder pickoff in the drain tube.
Figure 4:
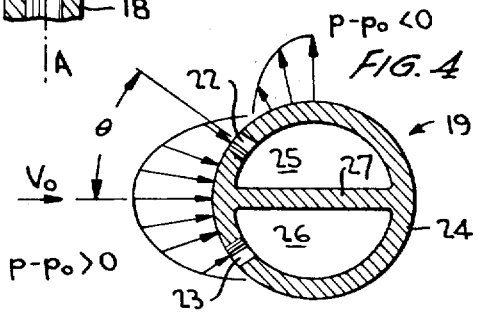
FIG. 4 is an enlarged cross-sectional view of the pickoff of FIG. 3 taken along lines 4—4 of FIG. 3.

The details of pickoff 19 can be more readily appreciated with specific reference to FIGS. 3 and 4. Pickoff element 19 is preferably a slotted, hollow cylinder, closed at one end, which extends into the drain of sensor 10 with its axis perpendicular to the drain axis which is also the sensor axis A—A. This pickoff element senses changes in the flow direction in drain passage 21 in one embodiment by means of a pair of parallel arranged axial slots 22 and 23 which extend through the pickoff cylinder wall 24 and into a pair of separate output channels 25 and 26, respectively, which are formed by a wall member 27. The operation of the slotted cylinder pickoff 19 can be explained by referring to the two dimensional flow around a circular cylinder whose axis is perpendicular to the flow some distance ahead of the cylinder. The pressure distribution around such a cylinder is shown in FIG. 4 by the distribution of the pressure difference, $p-p_o$, somewhat as represented by the radial ordinates in FIG. 4, and by $$p+\rho/2(4V_o^2 \sin^2\theta)=H$$

where H is the total pressure, $\rho$ is the density, $V_o$ is the fluid velocity, p is the pressure at the angle $\theta$, and $\theta$ is the angle measured from the stagnation point on the cylinder. At the stagnation point the pressure difference is $$p-p=\tfrac{1}{2}\rho V_o^2$$

When an aperture is provided in the surface of the cylinder, such as slots 22 and 23, at the critical angle $\theta$, the pressure at this point is static. The slotted cylinder pickoff 19 can be positioned with the slots at any desired $\theta$. When the angle of the helical flow through the drain passage 21 is changed, as by a change in the angular rate of rotation of the sensor, the stagnation point on the cylinder shifts and the static pressure at the slots changes thereby producing a signal that is dependent on the angular rate of rotation of the sensor. The change in the pressure measured at a point on the cylinder with respect to a change in the stagnation point is given by $$dp/d\theta = -4\rho V_o^2 \sin\theta \cos\theta$$

$V_o$, the axial velocity of the fluid stream in the drain, can be calculated approximately by use of the continuity equation if the flow is considered incompressible and isothermal.

The rotation of the rate sensor in a plane perpendicular to its axis causes the flow to move at an angle $\alpha$ to the axis of the drain. For small deflections, this angle is approximated by $$\tan\alpha \simeq \alpha \simeq V_t V_z$$

where $V_z$ is the average flow velocity in the drain and $V_t$ is the tangential velocity at the slots on the pickoff which is found from the law of conservation of angular momentum. For a unit mass of fluid, $\delta M$, $$\delta M r_o V_o = \delta M r_o 2\omega_o = \delta M r_s V_t$$

or $$V_t = r_o^2 \omega_o / r_s$$

where $r_s$ is the radius at the pickoff slot, $r_o$ is the coupler radius and $\omega_o$ is the angular velocity of the sensor. It can be shown further that rotation of the rate sensor changes the stagnation point by the same angle $\alpha$, which is equivalent to changing the angular position of the pickoff slot by an angle $\alpha$.

Figure 5:
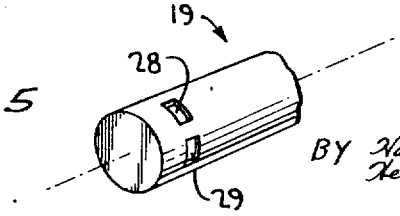
FIG. 5 is a prospective view of a slotted cylinder pickoff having circumferential slots.
Figure 6:
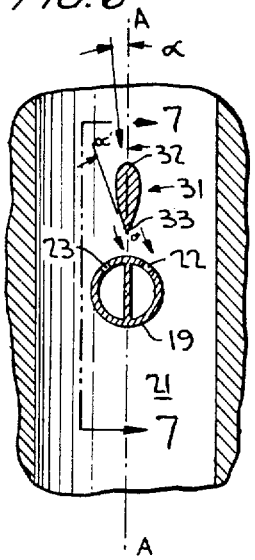
FIG. 6 is a cross-sectional view of a portion of the drain tube of a vortex rate sensor which shows an airfoil section in combination with the slotted cylinder pickoff of FIG. 3.

By way of specific example, two types of slots for the cylindrical pickoff are shown. First, an axial slot such as 22 or 23, which averages the radial velocity distribution, and second, a circumferential slot such as 28 or 29, shown in FIG. 5, which averages the pressure distribution around the pickoff 19. The output of the axial slot type pickoff depends on $1/r_s$, where $r_s$ is the radius of the drain at the pickoff slot. Because of the limit circle at the center of the vortex produced in the drain, the actual output does not increase as rapidly as might be expected from a consideration of $\overline{dp}/d\omega$. The output of the circumferential slot type pickoff depends on sin $2\theta$. By averaging this parameter over the angular length of the slot it can be shown that the maximum output occurs at 45°; therefore, the average slot position should be placed at 45° from the stagnation point. In the axial slotted case, for maximum output, the angular position of the slot is also approximately 45°. The circumferential slot should be placed at a small radius, $r_s$, so as to obtain a relatively large helical angle.

The size of the pickoff slot is determined by the input impedance of the pure fluid device to be driven by the sensor. If the device has a low input impedance, the slots must be large to supply flow. If the device on the other hand has a high input impedance, the slots should be small which will give a larger output pressure. The sensor works best with high input impedance devices, since the maximum sensitivity occurs for small slots. Because averaging over the circumferential slot does not reduce the pressure signal as much as averaging over the axial slot, circumferential slots appear to be better for low impedance devices. The present vortex rate sensor employing slotted cylinder pickoffs for producing pure fluid output signals can be made a push-pull device by providing one cylinder per drain in a double drain type rate sensor as mentioned above, with each cylinder having a single slot positioned at the optimum angle $\theta$ from the stagnation point.

Also, while the cylindrical pickoffs 19 are shown to extend only to the central axis A—A, cylinder 19 may extend completely across the drain opening 21 along the axis B—B shown in FIG. 3. This arrangement produces somewhat less noise and is easier to construct.

To increase the amplitude of the pressure signal produced by a cylindrical slotted pickoff, an airfoil section 31 is inserted in drain passage 21, a short distance upstream of slotted cylinder 19. Airfoil section 31 is preferably a symmetrical airfoil that possesses a high coefficient of lift to drag ratio, and is positioned with the chord of the airfoil in line with the direction of the drain flow for a particular initial condition of rotation of the sensor. In most situations, the chord of the airfoil section 31 coincides with the drain axis A—A. The angle between the chord of the airfoil section and either slot 22 or 23 should equal the optimum angle $\theta$, but it is contemplated that this angle can be varied for purposes of biasing the rate sensor. The airfoil section 31 senses a change in the helical angle $\alpha$ of the flow in the drain as a change in angle of attack. When the angle of attack is not zero, the flow velocity on one side of the airfoil is greater than the flow velocity on the other side of the airfoil. When these flows of different velocities meet at the trailing edge 33 of the airfoil 31, the angle $\alpha'$ between the direction of this flow and the drain axis A—A is considerably greater than the angle of attack at the leading edge 32. Slotted cylinder 19 which extends into the drain passages 21 under and along the trailing edge 33 of airfoil 31 sees the change in this flow direction as a change of angle of attack resulting in a differential pressure across slots 22 and 23.

Figure 7:
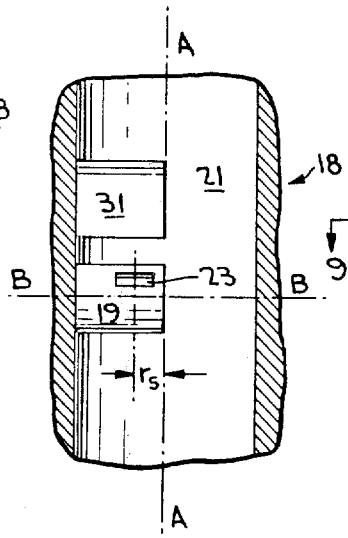
FIG. 7 is an elevation partly in section taken along lines 7—7 of FIG. 6.

The fluid output signal produced by slotted cylinder 19 in combination with the symmetrical airfoil section 31 is in the order of ten times greater than the fluid output signals produced by the slotted cylinder alone. The reason for the increased sensitivity of this combination is of course that the angle of deflection $\alpha'$ in the flow at the trailing edge of airfoil section 31 is greater than the helical angle $\alpha$ of the flow in the drain upstream of the airfoil section. In FIG. 7 airfoil section 31 is shown to extend half way across drain passage 21, but it is advantageous in some instances to have airfoil section 31 extend completely across the passage. Cylindrical pickoff 19 likewise can extend completely across the passage for the reasons given above.

Because of turbulence that exists along the trailing edge of an airfoil section caused by vortices generated along this edge, an alternate arrangement is to position the cylindrical pickoff a small horizontal distance away from axis A—A and the chord of the airfoil. It is also contemplated that an airfoil section such as 31 may be positioned upstream and between a pair of slotted cylinder pickoffs that are separated from one another a short distance on either side of the central axis with the cylinders having only a single slot and one output channel each as compared to the double channel output pickoff described above.

Figure 8:
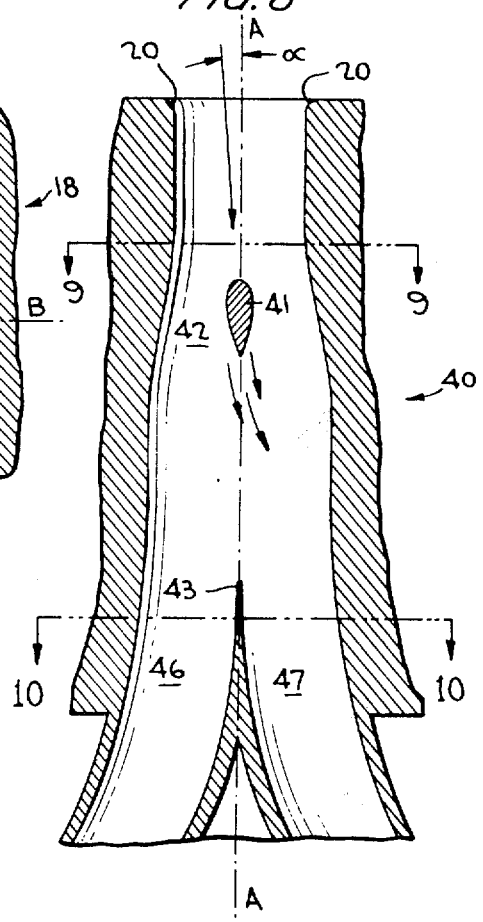
FIG. 8 is a cross-sectional view showing a modified drain tube according to the instant invention which shows an airfoil section in combination with a splitter and multiple-flow output means.

The vortex rate sensor pickoff techniques disclosed in FIGS. 2 through 7 are utilized to produce pressure type output signals with relatively low flow. When a high flow signal is required that is proportional to the angular rate of rotation of the sensor, the pickoff arrangement shown in FIGS. 8 through 10 is employed.

Figure 9:
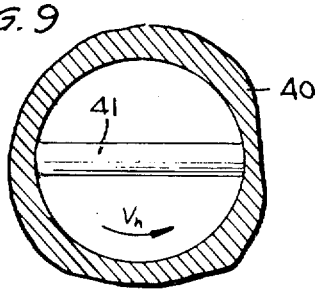
FIG. 9 is a plan view, partly in section, taken along the lines 9—9 of FIG. 8.
Figure 10:
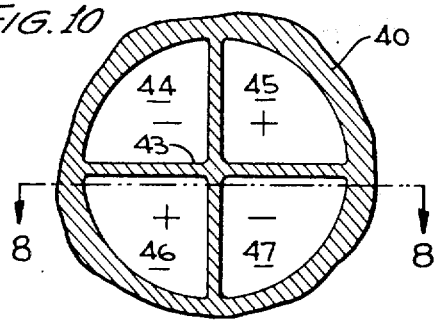
FIG. 10 is a plan view, partly in section, taken along the lines 10—10 of FIG. 8.

A symmetrical airfoil section 41 having a high coefficient of lift to drag ratio is installed in the drain 40 of a vortex rate sensor transverse to the drain axis A—A with the chord of the airfoil section orientated for a particular drain flow condition but typically coinciding with the drain axis A—A and extending completely across the drain opening as more clearly shown in FIG. 9. Airfoil section 41 is preferably positioned in an expanding portion 42 of the drain 40 for optimum efficiency. Below the airfoil section 41, or downstream, the drain becomes four equal output channels 44, 45, 46, and 47 which are formed by a double splitter 43.

When the vortex rate sensor is rotated in a plane perpendicular to its axis A--A, a vortex is generated in the chamber (not shown), and a helical flow is generated in the drain 40. The airfoil section 41 sees the helical angle $\alpha$ as an angle of attack and when this angle is not zero, the velocity on one side of the airfoil is greater than the velocity on the other side. At the trailing edge where these two streams of different velocities meet, a deflection of the drain flow occurs in the expanded region 42 of the drain 40 which produces a differential flow across splitter 43. As a result of the deflection of the drain flow caused by airfoil section 41, a differential flow is produced across the splitter 43.

Assuming a counterclockwise rotation of the rate sensor as indicated by the direction of $\omega$ in FIG. 1, helical flow having a counterclockwise direction will be produced in drain 40, as shown by the arrow $V_h$ in FIG. 9. This flow will result in the higher velocity flow leaving the output channels 45 and 46 and the lower velocity flow leaving the drain via output channels 44 and 47 as shown by the plus and minus signs, respectively, in FIG. 10. The double splitter 43 in dividing the drain into 4 equal output channels provides a dual push-pull output.

The flow output signal produced in the output channels 44 to 47 become the input signals for an appropriate pure fluid device (not shown) having a low input impedance. Airfoil section 41 can alternatively be installed in drain 40 to extend only as far as the drain axis A—A in a cantilevered manner such as in the airfoil and slotted cylinder arrangement shown in FIG. 7. This construction will tend to increase the output flow but it will also result in somewhat more noise in the output signal.

High flow output signals can also be produced by means of a flow divider device in the drain such as shown in FIGS. 8–10, but not including an airfoil section upstream thereof. A pickoff arrangement without an airfoil section will result in less noise being produced in the output signals but will probably sacrifice the sensitivity associated with an airfoil section being present in the drain upstream of the divider. In this arrangement, the sensitivity can be increased to a certain extent by positioning one of the diametrical edges of the double splitter 43 a slight distance upstream of the other.

Figure 11:
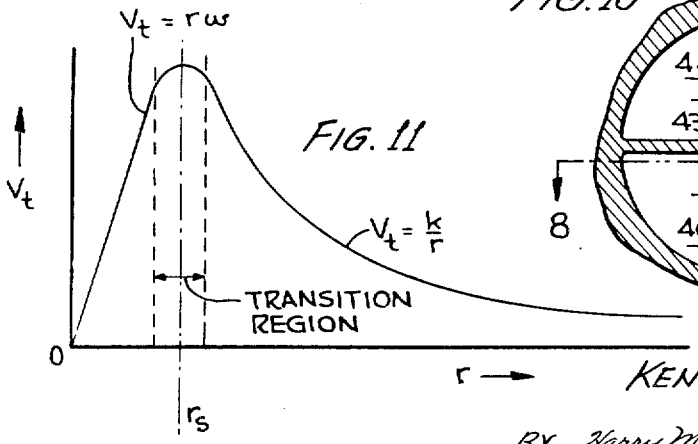
FIG. 11 is a graphical representation of the tangential velocity distribution for the combined vortex sink flow.

In the pickoff arrangements employing slotted cylinders as shown in FIGS. 2–7, the openings are positioned in the drain to produce an output signal in the form of a pressure change that is proportional to the angular rate of rotation of the sensor. From a consideration of a pressure and velocity distribution curve such as shown in FIG. 11, which is taken for actual vortex flow including viscous effects which were not considered in arriving at earlier equations, of a portion of the fluid in the region of the drain near $r=0$ rotates like a solid body and the tangential velocity $V_t$ then varies as the product of $r\omega$. Outside this central core of solid body rotation is a transition region. Outside the transition region the fluid flows as in a free vortex, where tangential velocity $V_t$ varies as $K/r$. From the curve shown in FIG. 11, it can be seen that the region of the highest tangential velocity, and consequently the region of highest pressure, is located in the transition region.

It, therefore, becomes apparent that the optimum position for the opening in the cylindrical pickoff should be located at a radius $r_s$ which corresponds to the midpoint of the transition region. However, since the transition region and the radius $r_s$ are extremely difficult to locate and because the opening should be sufficiently large enough to produce a usable output signal, the opening in the cylinder will in most instances be large enough to extend across the entire transition region.

In dealing with vortex sink flow as with most any other kind of fluid flow, it is very important that edges and abrupt changes in the shape of the walls containing the fluid be avoided to reduce turbulence. For this reason, the entrance to the drain tube 18 in the vortex rate sensor 10 is shown to have a smoothly curved edge 20 to reduce turbulent effects which, of course, result in the noise in the output signals from the rate sensor.

In one embodiment of [our] *my* invention, the following dimensions are employed. The inside diameter of coupler 15 is 3.625 inches. The height of the chamber is .1 inch. Drain passage 18 has an inside diameter of 0.080 inch. Circumferential slots 28 and 29 have a length of 0.010 inch, a width of .008 inch and are located at an average or mean radius $r_s$ of .005 inch. These dimensions are merely illustrative and [we] *I* do not wish to be limited thereto.

It will be apparent that the embodiments shown are only exemplary and that various modifications can be made in construction and arrangement within the scope of the invention as defined in the appended claims.

[We] *I* claim as [our] *my* invention:

1. In a pure fluid device for sensing the angular rate of rotation of a body about an axis including a vortex chamber having a circular cross-sectional area, means for introducing pressurized fluid into said chamber with substantially only a radial component of velocity and a cylindrical drain passage located at the center of said chamber with the axis of said drain passage coinciding with the axis of said chamber and being parallel to the axis of said body, whereby upon rotation of said device in a plane perpendicular to the axis of said body vortex flow is generated in said chamber and helical flow is generated through said drain passage, improved fluid readout means for said device for sensing changes in said helical flow as a measure of the rate of rotation of said device comprising:

a. a hollow cylindrical pickoff tube located in said drain passage with the axis of said pickoff being transverse to said drain axis;

b. a portion of the wall of said pickoff having aperture means for providing fluid communication between said drain passage and output channel means in said pickoff;

c. said pickoff being orientated in said drain passage with said aperture means displaced from the axis of said drain by an angle $\theta$ such that the pressure produced at said aperture means is substantially static;

d. said pickoff producing fluid output signals in response to the changes in the helical angle of said drain flow as measured by corresponding changes in the static pressure at said aperture means;

e. whereby said fluid output signals are proportional to the angular rate of said rotation.

2. The rate sensing device according to claim 1 wherein:

a. the center of said aperture means is located closely adjacent to said drain axis in the vicinity of the radius of the limit circle in the transition region of said helical flow produced in said drain, b. whereby the maximum tangential velocity and consequently the highest pressure of said drain flow will be sensed by said pickoff.

3. The rate sensing device according to claim 2 wherein:

a. said aperture means comprises a pair of spaced slots with their respective centers being separated from each other in said pickoff wall by an angle equal to $2\theta$, b. each of said slots communicating with a separate output channel in said pickoff for producing fluid output signals in response to the pressure changes sensed at said slots as the helical angle of said drain flow changes, c. whereby said fluid output signals are proportional to said rate of rotation of said drive.

4. The rate sensing device according to claim 3, wherein said slots are parallel to each other and are axially arranged in said pickoff wall.

[5. The rate sensing device according to claim 3, wherein said slots are circumferentially arranged.]

6. The rate sensing device according to claim 3, wherein the angle $\theta$ equals approximately 45°.

[7. In the rate sensing device claim 1, the fluid readout means further comprising:

a. an airfoil section located in said drain passage transversely of said drain axis with the trailing edge thereof being upstream of and in close proximity with said pickoff means, b. said airfoil section being a symmetrical airfoil processing a high coefficient of lift to drag ratio, c. said airfoil section cooperating with said pickoff to provide an amplification of the changes in the helical angle of said drain flow to be sensed by said pickoff slots, d. whereby the pressure of said output signals is greatly increased.]

[8. In the rate sensing device according to claim 3, the fluid readout means further comprising:

a. a symmetrical airfoil section possessing a high coefficient of lift to drag ratio located in said drain passage transversely of said drain axis with the trailing edge thereof being upstream of and in close proximity with said pickoff, b. said airfoil section being positioned between said pickoff slots such that the angle between the chord of the airfoil and one of said slots is equal to $\theta$, c. said airfoil section cooperating with said pickoff to provide an amplification of the changes in the helical angle of said drain flow to be sensed by said pickoff, d. whereby the sensitivity of said readout means is greatly increased.]

[9. In a vortex angular rate sensor having a vortex chamber supplied with fluid under pressure, an input manifold, a porous coupler ring, and a cylindrical drain passage located at the axis of said chamber and wherein the fluid enters said chamber from said manifold through said ring having substantially only a radial component of velocity, whereby upon rotation of said rate sensor in a plane perpendicular to said axis vortex flow is generated in said chamber and helical flow is generated through said drain, improved readout means for producing fluid output signals indicative of the rate of rotation of said device comprising:

a. double splitter means extending across said drain passage and dividing said passage into four equal output channels, b. the upstream edges of said splitted means being transverse to the axis of said drain passage, c. said splitter means producing a differential flow in said output channels in response to a change in said helical flow, d. whereby said differential flow results in a high flow output signal in said output channels that is proportional to the rate of said rotation, e. a symmetrical airfoil section possessing a high lift to drag ratio positioned in an expanded portion of said drain passage upstream of said splitter means, f. said airfoil section being transverse to the axis of said passage, g. said airfoil section cooperating with said splitter means to deflect said helical drain flow to produce a differential flow across said splitter means, h. whereby said differential flow generates high flow output signals in said output channels proportional to the rate of said rotation.]

[10. The rate sensor according to claim 9, wherein the edge of one portion of said splitter means that extends diametrically across said drain passage is located a slight distance upstream of the other edge portion of said splitter means whereby the sensitivity of said readout means is improved.]

*11. A sensor for providing a fluid pressure signal as a function of the vortical fluid flow component of combined axial and vortical fluid flow in a fluid flow channel having a specified central longitudinal axis, said sensor comprising: a hollow body having an interior chamber said hollow body being positioned in said channel in the path of said combined fluid flow, a sensor orifice defined in said hollow body for providing fluid communication between said channel and said interior chamber, said sensor orifice being directed generally toward said combined fluid flow and displaced from said central longitudinal axis whereby to sense the angle of attack of said vertical flow and thereby generate a fluid pressure in said chamber proportional to said vertical fluid flow.*

*12. The combination according to claim 11 wherein said hollow body is a cylinder disposed transversely of said combined fluid flow.*

* * * * *